United States Patent [19]

McMaster et al.

[11] Patent Number: 4,731,429

[45] Date of Patent: Mar. 15, 1988

[54] NOVEL POLY(ARYL ETHER KETONES)

[75] Inventors: Lee P. McMaster, Brookfield, Conn.; Paul A. Winslow, West Millington, N.J.

[73] Assignee: Amoco Corporation, Chicago, Ill.

[21] Appl. No.: 745,139

[22] Filed: Jun. 17, 1985

[51] Int. Cl.$^4$ .............................................. C08G 65/40
[52] U.S. Cl. .................................. 528/127; 528/125; 528/126; 528/128; 528/219
[58] Field of Search ............... 528/127, 125, 126, 128, 528/219

[56] References Cited

U.S. PATENT DOCUMENTS 4,320,224  3/1982  Rose et al. ........................... 528/125

Primary Examiner—Morton Foelak
Assistant Examiner—M. L. Moore
Attorney, Agent, or Firm—Donald M. Papuga; William H. Magidson; Ralph C. Medhurst

[57] ABSTRACT

Described herein are novel poly(aryl ether ketones) which display unique and outstanding high temperature properties, a unique blending behavior and excellent fabricability characteristics.

19 Claims, No Drawings

NOVEL POLY(ARYL ETHER KETONES)

FIELD OF THE INVENTION

This invention is directed to a new class of poly(aryl ether ketones). The poly(aryl ether ketones) are prepared from a group of well defined starting materials and display unique and outstanding high temperature properties, a unique blending behavior and excellent fabricability characteristics.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involved the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415–2427, Johnson et al., U.S. Pat. Nos. 4,108,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol 22, August, pp. 1096–1103; Blundell et al., Polymer, 1983 vol. 24, August, pp. 953–958, Atwood et al., Polymer Preprints, 20, no. 1, April 1979, pp. 191–194; and Rueda et al., Polymer Communications, 1983, vol. 24, September, pp. 258–260. In early to mid-1970, Raychem Corp. commercially introduced a PAEK called STILAN ™, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by thse processes have been stated by Dahl et al., supra, to be brittle and thermally unstable. The Dahl patents, supra, allegedly depict more expensive processes for making superior PAEK's by Friedel-Crafts catalysis.

As indicated earlier PAEK's may also be produced by the nucleophilic route. The latter route is used, for example, for the commercial preparation of Victrex PEEK. The nucleophilic substitution reaction yields generally polymers with good properties. The main drawback of this type polymerization is the lack of solvents capable of dissolving the highly crystalline poly(aryl ether ketones) and keeping them in solution long enough to reach molecular weights sufficiently high at which satisfactory properties are displayed. The problem is particularly severe in cases wherein the preparation of higher melting materials (Tm$>350°$ C.) is attempted by this route.

THE INVENTION

This invention is directed to novel polymers and copolymers that are tough and high melting and melt-fabricable in spite of their high melting points. They are particularly useful in high temperature applications and applications requiring good wear and abrasion resistance. They display the unique property of forming isomorphic blends with the poly(ether ketone) made by the Friedel-Crafts polymerization of a mixture of terephthaloyl and isophthaloyl chlorides with diphenyl ether. The polymers are prepared by the mucleophilic polycondensation of the monomers shown in equation (1): (In the following equations "Ph" is a phenyl or a 1,4-phenylene unit with the proviso that where there are two carbonyl groups attached to the same phenyl ring, up to 50% of these groups may be in the 1,3 position to each other).

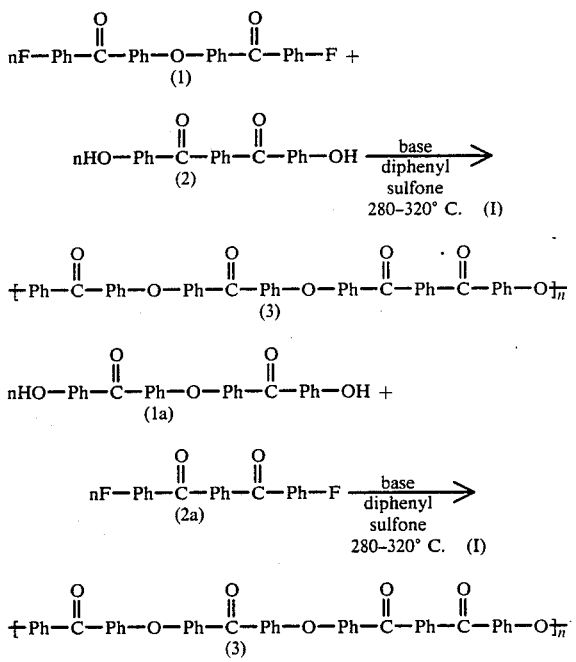

Due to transetherification processes accompanying the polymerization, the distribution of keto and ether groups in the chains may not be exactly as depicted in structure (3). It is important to note, however, that the material contains a rather high proportion of keto-functions and, as a result, displays a melting point of about 375° C., well above that of STILAN and PEEK (365° C. and 335° C., respectively).

Polymers of the type (3) can also be made by the nucleophilic polycondensation route illustrated as follows starting with a combination of other monomers:

(II)

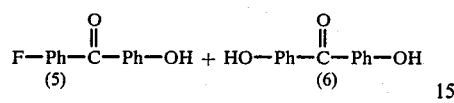

or

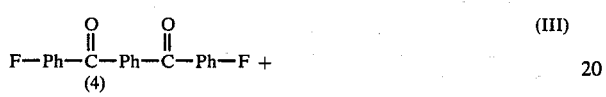
(III)

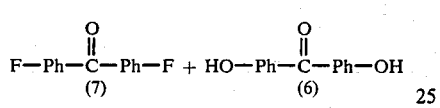

wherein the mole ratio of (4):(7):(6) is equal to 1:0.5:1.5, or

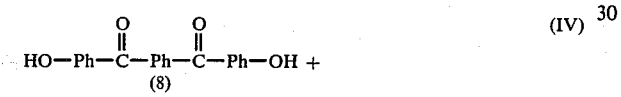
(IV)

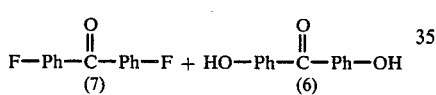

wherein the mole ration of (8):(7):(6) is equal to 1:1.5:0.5.

It has long been known that the melting point of poly(aryl ether ketones) is dependent upon the keto/ether ratio. Generally, the higher the keto group content the higher the polymer melting point. Hence, the fact that a high melting polymer (3) was obtained in the polymerization depicted above was expected.

There are, however, several unique and unexpected features that were uncovered in our studies. First of all, polymer (3) displays excellent mechanical properties at molecular weights at which it can be processed and fabricated. These molecular weights correspond to reduced viscosities (as measured in concentrated sulfuric acid at 25° C. at a concentration of polymer of 1.0 gm/100 ml. of acid) above about 1.0 dl/g and, preferably above 1.2 dl/g. For comparison purposes, it is well known that the electrophilic polymerization described in equation (V) yields a polymer (12) melting at about 385° C.

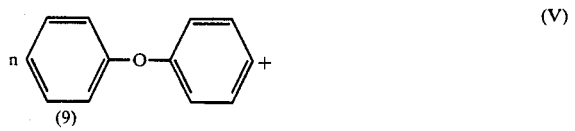
(V)

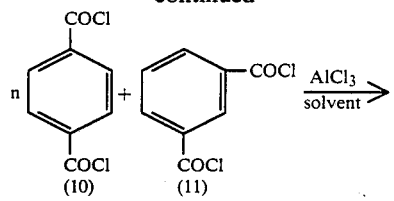

at a mole ratio of about 0.95:0.05

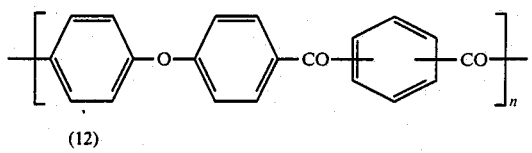

However, in contradistinction to the material (3) polymer (12) achieves toughness at molecular weights at which commercial fabrication is for all practical purposes impossible, or at least totally impractical.

Should lower melting points be desirable for any reason, they can be easily achieved by replacing part of the diphenol (2) (equation (1)) with another diphenol, for example, hydroquinone. Thus, at a fifty mole percent replacement level, i.e., when fifty mole percent of (2) are replaced with hydroquinone, the observed melting point of the copolymer is about 364° C. Further increase in hydroquinone (up to about 75–80 mole %) gives a copolymer melting at about 350° C. Thus, a flexibility which allows for the preparation of materials melting over a broad temperature range is at hand. Obviously, other diphenols can be used in equation (2) and, thus, additional property modification is possible. The preferred diphenols that are useful for such various property modification purposes are the following:

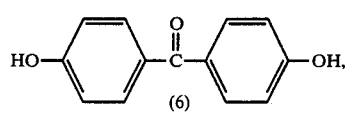
(6)

(13)

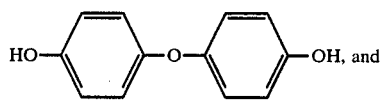
(14)

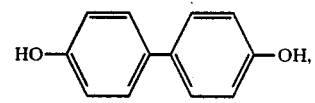
(15)

In another embodiment of this invention, the properties of polymer (3) can be modified by the use of an additional dihalo monomer with monomer (1). These dihalo monomers include the following:

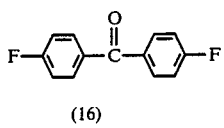

(16)

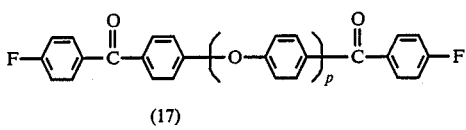

(17)

wherein p is greater than 1.

The high melting points of the polymers of the instant invention allow them to be used in high temperature applications; one particularly important feature in which a high melting temperature is of critical importance is wear and abrasion resistance. It is indeed well known that wear is proportional to the product of pressure (P) and velocity (V) at product interface. However, the higher the value of $P \times V$ the higher is also the temperature that develops at the interface. Hence, the limiting $P \times V$ is to a great extent determined by the polymer melting point.

Another unexpected feature of polymer (3) is its isomorphism with polymer (18), equation (VI):

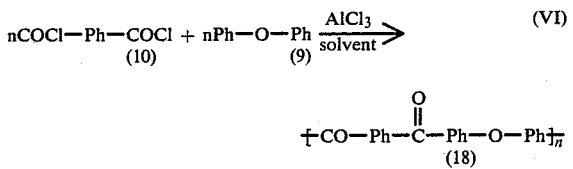

The melting point of polymer (18) is high (about 395° C.); blending of polymer (18) with polymer (3) is yet another way to novel compositions displaying good mechanical properties in combination with excellent high temperature characteristics.

As pointed out in the foregoing equations polymer (3) and its copolymers are prepared via the nucleophilic polycondensation method.

The reactions are carried out by heating a mixture of the monomers at a temperature of from about 100° to about 400° C. The reactions are conducted in the presence of an alkali metal carbonate or bicarbonate. Preferably a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous and, if hydrated salts are employed, where the polymerization temperature is relatively low, e.g. 100° to 250° C., the water should be removed, e.g. by heating under reduced pressure, prior to reaching the polymerization temperature.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above the amount of the second (higher) alkali metal carbonate or bicarbonate employed is such that there are 0.001 to about 0.2 grams atoms of the alkali metal of higher atomic number per gram atom of sodium.

Thus when using a mixture of carbonates, e.g. sodium carbonate and cesium carbonate, there should be 0.1 to about 20 moles of cesium carbonate per 100 moles of sodium carbonate. Likewise when using a mixture of a bicarbonate and a carbonate, e.g. sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

Preferably, from 0.005 to 0.1 gram atoms of the alkali metal of the second alkali metal carbonate or bicarbonate per gram atom of sodium is used.

The bisphenol(s) and the dihalobenzenoid compound(s) should be used in substantially equimolar amounts. An excess of one over the other leads to the production of lower molecular weight products. However a slight excess, up to 5 mole %, of the dihalide or the bisphenol may be employed if desired.

The reaction may be carried out in the presence of an inert solvent, or in the absence of a solvent.

Preferably a solvent is employed and is an aliphatic or aromatic sulfoxide or sulfone of the formula $$R-S(O)_x-R'$$

where x is 1 or 2 and R and R' are alkyl or aryl groups and may be the same or different. R and R' may together form a divalent radical. Preferred solvents include dimethyl sulfoxide, dimethyl sulfone, sulfolane (1,1 dioxothiolan), or aromatic sulfones of the formula.

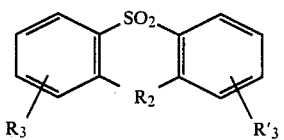

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include N,N'-dimethyl acetamide, N,N-dimethyl formamide and N-methyl-2-pyrrolidone.

The polymerization temperature is in the range of from about 100° to about 400° C. and will depend on the nature of the reactants and the solvent, if any, employed. The preferred temperature is above 270° C. The reactions are generally performed under atmospheric pressure. However, higher or lower pressures may be used.

For the production of some polymers, it may be desirable to commence polymerization at one temperature, e.g. between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

When no solvent is employed in the process of the invention, the temperature should be sufficient to maintain the bisphenol/dihalobenezenoid compound, and the polymer produced therefrom in the molten state.

To minimize cleavage reactions it is preferred that the maximum polymerization temperature be below 350° C.

The polymerization reaction may be terminated by mixing a suitable end capping reagent, e.g. a mono or polyfunctional halide such as methyl chloride, t-butyl chloride or 4,4'-dichlorodiphenyl sulphone with the reaction mixture at the polymerization temperature, heating for a period of up to one hour at the polymerization temperature and then discontinuing the polymerization.

The polymers may also be prepared by the reaction of a mixture of at least one bisphenol and at least one dihalobenzenoid compound, or a halophenol in the presence of a combination of sodium carbonate and/or bicarbonate an alkali metal halide selected from potassium, rubidium, or cesium fluoride or chloride, or combinations thereof.

The reaction is carried out by heating a mixture of one or more bisphenols and one or more dihalobenzenoid compounds or halophenols, at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate or bicarbonate and potassium, rubidium or cesium fluoride or chloride, or combinations thereof employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from a higher alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. In this respect, cesium is a more active metal and potassium is a less active metal so that less cesium and more potassium are used. Further, the chloride salts are less active than the fluoride salts so that more chloride and less fluoride is used.

Where a bisphenol and dihalobenzenoid compound are employed, they should be used in substantially equimolar amounts when maximum molecular weight is sought. However a slight excess, up to 5 mole %, of dihalide may be employed if desired. An excess of one over the other leads to the production of low molecular weight products.

The reactions are carried out in the presence of an inert solvent.

The reaction temperature is in the range of from about 100° to about 400° C. and will depend on the nature of the reactants and the solvent. The preferred temperature is above 250° C. The reactions are preferably carried out at ambient pressure. However, higher or lower pressure can also be used. The reaction is generally carried out in an inert atmosphere.

For the production of some polymers it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention may be blended with one or more other polymers such as polyarylates, polysulfones, polyetherimides, polyamideimides, polyimides, polyphenylene sulfides, polyesters, polycarbonates, polyamides, polyhydroxyethers, and the like.

The polymers of this invention may be fabricated into any desired shape, i.e., moldings, coatings, films, or fibers. They are particularly desirable for use as electrical insulation for electrical conductors.

Also, the polymers may be woven into monofilament threads which are then formed into industrial fabrics by methods well known in the art as exemplified by U.S. Pat. No. 4,359,501. Further, the copolymers may be used to mold gears, bearings and the like.

EXAMPLES

The following examples serve to give specific illustrations of the practice of this invention but they are not intended in any way to limit the scope of this invention.

EXAMPLE 1

A four neck 250 ml. glass resin kettle is equipped with a mechanical stirrer, nitrogen inlet, thermocouple, and a Dean Stark trap with fitted condenser. To the kettle are charged 31.671 gms. (0.0765 moles) of 1,4-bis(p-fluorobenzoyl)diphenyl ether, 24.327 gms. (0.0765 moles) of 1,4-bis(p-hydroxybenzoyl)benzene, 7.70 gms. (0.0727 moles) of sodium carbonate, 0.53 gms. (0.0038 moles) of potassium carbonate, and 68.6 gms. of diphenyl sulfone. After purging the reaction mixture with nitrogen for 1 hour at room temperature, it is heated to 200° C. and held at that temperature for 1 hour. The temperature is raised to 250° C. and held for 15 minutes and then to 320° C. for 4.5 hours. The reaction mixture is poured into an aluminum pan, solidified and ground into fine particles. The particles are refluxed in acetone for 1.5 hours, in hydrochloric acid for 1.5 hours and then washed in a blender with water ($2\times500$ ml.) and acetone ($2\times500$ ml.). The resulting polymer is dried for 18 hours at 100° C.

Its melting point is about 375° C.; its glass transition temperature is about 155° C. Mechanical properties and pendulum impact values are very good.

EXAMPLE 2

The procedure is repeated in a manner similar to that of example 1. The condensation of 1,4-bis(p-fluorobenzoyl)benzene with 4-fluoro-4'-hydroxybenzophenone, and 4,4'-dihydroxybenzophenone yields a tough polymer with properties very similar to those of the polymer made in Example 1.

EXAMPLES 3a and 3b

These two examples are performed in a manner similar to that of Example 1. The ingredients are:

Example 3a 1,4-bis(p-fluorobenzoyl)benzene, 4,4'-difluorobenzophenone, and 4,4'-dihydroxybenzophenone in a mole ratio of 1:0.5:1.5.

Example 3b 1,4-bis(p-hydroxybenzoyl)benzene, 4,4'-difluorobenzophenone, and 4,4'-dihydroxybenzophenone in a mole ratio of 1:1.5:0.5.

Tough polymers with properties similar to those of the polymer made in Example 1 are obtained.

EXAMPLE 4

The procedure is repeated in a manner similar to that of Example 1 except that 50 mole % of the 1,4-bis(p-hydroxybenzoyl)benzene are replaced with the equivalent amount of hydroquinone. A tough material, melting at about 364° C. and having a Tg of about 150° C. is obtained.

EXAMPLE 5

A four neck 250 ml. glass resin kettle was equipped with a mechanical stirrer, nitrogen inlet, thermocouple, and a Dean Stark trap fitted with a condenser. The kettle were charged with 12.49 gms. (0.0302 moles) of 1,4-bis(p-fluorobenzoyl)diphenyl ether, 9.549 gms. (0.0300 moles) of 1,4-bis(p-hydroxybenzoyl)benzene, 3.081 gms. (0.0291 moles) of sodium carbonate, 0.211 gms. (0.0015 moles) of potassium carbonate, and 62.3 gms. of diphenyl sulfone. The apparatus was then evacuated and filled with nitrogen (five times) after which 20 ml of xylene was added and the mixture heated to 200° C. for 1 hour, while the xylene was continuously replinished. The temperature was raised to 250° C. and held 15 minutes, 320° C. for five hours, 335° C. for 1.5 hours and then to 345° C. for 8 hours. Xylene addition was discontinued once the mix reached 320° C. The reaction mixture was poured into a stainless steel pan where it solidified upon cooling and was ground into fine particles. The particles were refluxed in acetone for 1.5 hours, in hydrochloric acid for 1.5 hours and then washed in a blender with water ($2\times500$ ml.) and acetone ($2\times500$ ml.). The resulting polymer was dried in a vacuum oven for 18 hours at 100° C.

The material contained some gel specs however. The soluble fraction had a reduced viscosity of 0.80 dl/gm (1% in concentrated sulfuric acid, 25° C.).

The melt flow ratio $MF_{30}/MF_{10}$ was measured by heating a plug of polymer in a Tinius Olsen Thermodyne (melt flow cell) at 350° C. The polymer was added to the preheated chamber of the thermodyne and put under a constant pressure of 44 psi. After 10 and 30 minutes, samples of polymer were taken by allowing the polymer to flow freely from the bottom of the cavity. The melt flow ratio was 0.92. The melting point of the polymer was 377° C. The glass transition temperature was 164° C. as measured by the method described by Olabisi et al. in Polymer-Polymer Miscibility, Academic Press, New York (1979), pages 126–127.

What is claimed is:

1. A process for preparing a poly(aryl ether ketone) which consists essentially of reacting 4,4'-bis(p-fluorobenzoyl)diphenyl ether with 1,4-bis(p-hydroxybenzoyl)benzene under nucleophilic polycondensation conditions.

2. A process for preparing a poly(aryl ether ketone) which consists essentially of reacting 4,4'-bis(p-hydroxybenzoyl)diphenyl ether with 4,4'-bis(p-fluorobenzoyl)benzene under nucleophilic polycondensation conditions.

3. A process for preparing a poly(aryl ether ketone) which consists essentially of reacting 1,4-bis(4-fluorobenzoyl)benzene with 4-fluoro-4'-hydroxybenzophenone and 4,4'-dihydroxybenzophenone in a mole ratio of 1:1:1 under nucleophilic polycondensation conditions.

4. A process for preparing a poly(aryl ether ketone) which consists essentially of reacting 1,4-bis(p-fluorobenzoyl)benzene with 4,4'-difluorobenzophenone and 4,4-dihydroxybenzophenone in a mole ratio of 1:0.5:1.5 under nucleophilic polycondensation conditions.

5. A process for preparing a poly(aryl ether ketone) which consists essentially of reacting 1,4-bis(p-hydroxybenzoyl)benzene with 4,4'-difluorobenzophenone and 4,4'-dihydroxybenzophenone in a mole ratio of 1:1.5:0.5 under nucleophilic polycondensation conditions.

6. A process as defined in any one of claims 1 to 5 which is conducted in the presence of an alkali metal carbonate and/or bicarbonate or mixtures thereof.

7. A process as defined in claim 6 wherein the alkali metal carbonate is sodium carbonate or bicarbonate and potassium carbonate or cesium carbonate, or mixtures thereof.

8. A process as defined in claim 6 wherein the reaction is carried out in the presence of sodium carbonate and/or bicarbonate and potassium, rubidium or cesium fluorides or chlorides.

9. A process as defined in any one of claims 1 to 5 which is conducted in the presence of an aprotic solvent.

10. A process as defined in claim 9 wherein the aprotic solvent is an aliphatic or aromatic sulphoxide, sulphone, or mixtures thereof.

11. A process as defined in claim 9 wherein the solvent is selected from N,N-dimethyl acetamide, N,N-dimethyl formamide, N-methyl pyrrolidone, or mixtures thereof.

12. A process as defined in any one of claims 1 to 11 wherein an additional diphenol is employed.

13. A process as defined in claim 12 wherein the additional diphenol is of the formula:

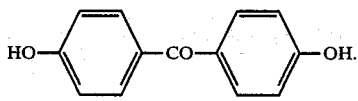

14. A process as defined in claim 12 wherein the additional diphenol is of the formula:

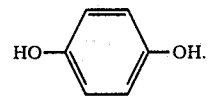

15. A process as defined in claim 12 wherein the additional diphenol is of the formula:

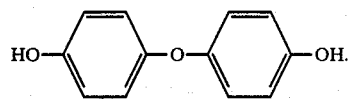

16. A process as defined in claim 12 wherein the additional diphenol is of the formula:

17. A process as defined in any one of claims 1 to 11 wherein an additional dihalo-compound is used.

18. A process as defined in claim 17 wherein the dihalo compound is of the formula:

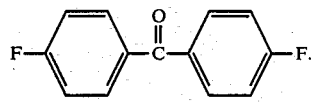

19. A process as defined in claim 17 wherein the dihalo compound is of the formula:

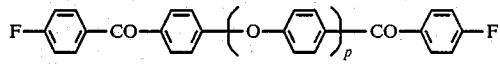

wherein p is greater than one.

* * * * *